May 7, 1946.　　　G. E. OLSON　　　2,399,887
FILTER
Filed July 17, 1943　　　3 Sheets-Sheet 1
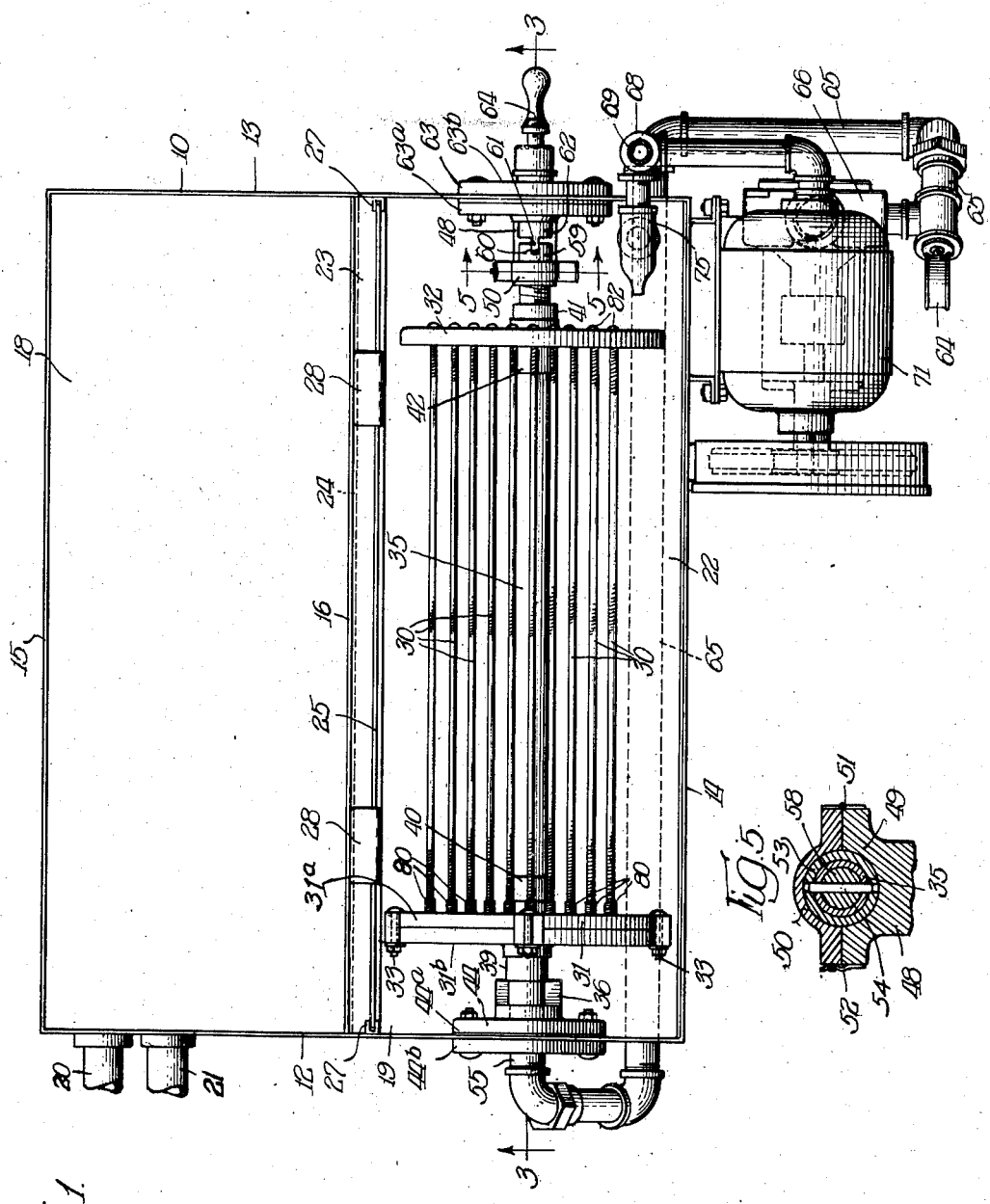
INVENTOR.
George E. Olson,
BY

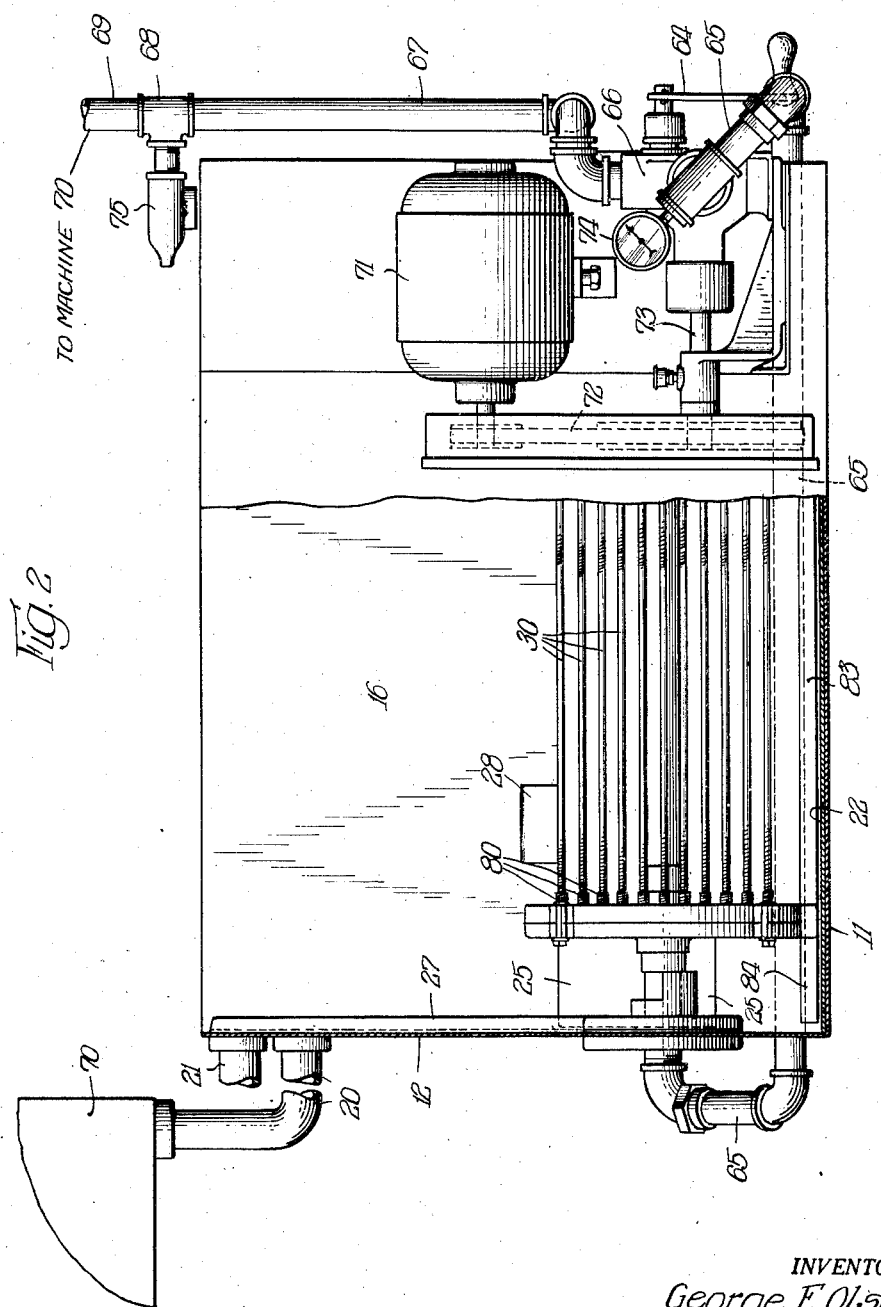

May 7, 1946.   G. E. OLSON   2,399,887
FILTER
Filed July 17, 1943   3 Sheets-Sheet 3
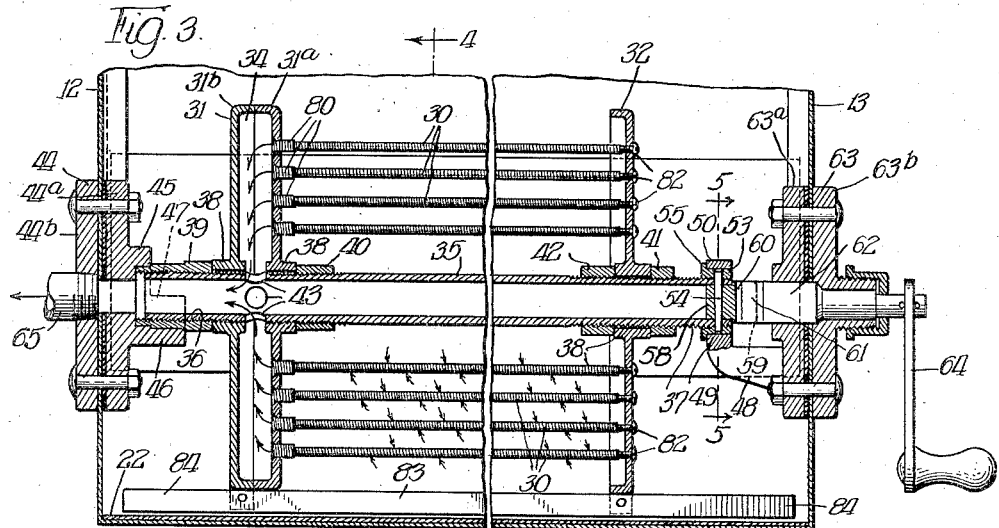
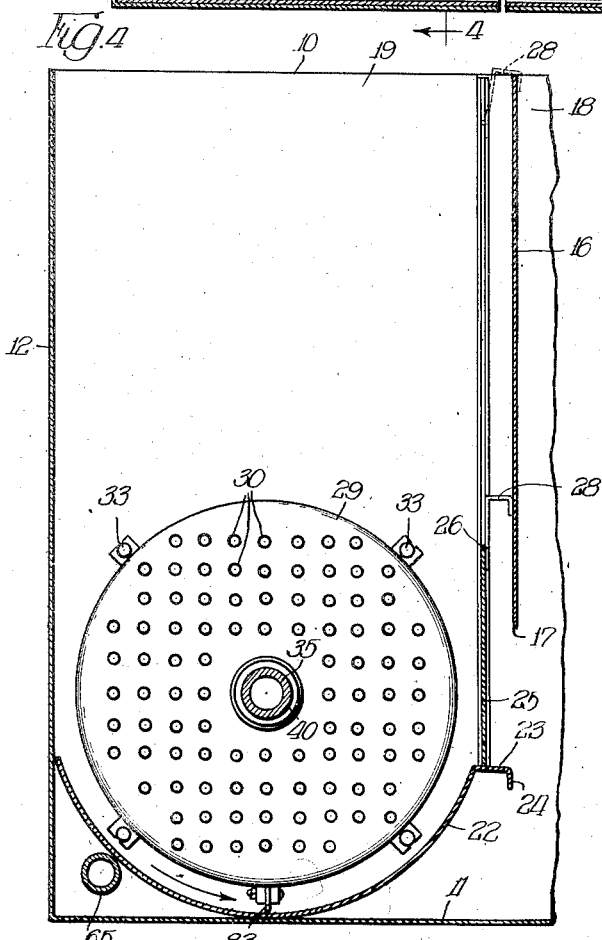
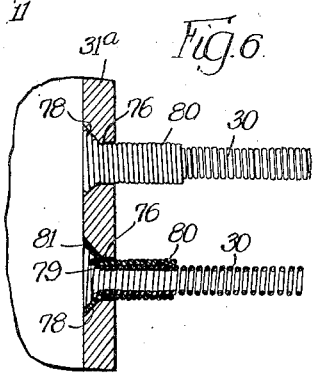
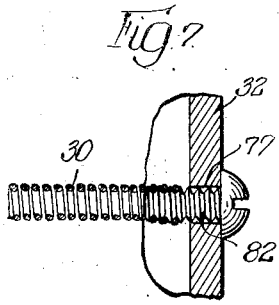
INVENTOR.
George E. Olson,
BY
Wilkinson, Huxley, Byron & Knight
Attys.

Patented May 7, 1946

2,399,887

UNITED STATES PATENT OFFICE 2,399,887

FILTER

George E. Olson, Chicago, Ill.

Application July 17, 1943, Serial No. 495,391

17 Claims. (Cl. 210—184)

The present invention relates to improvements in filters.

More particularly the present invention relates to improvements in the type of filter in which the filtering media include springs of the type variously called coil springs, spiral springs, or, more properly, helical springs, that is—springs the coils of which are arranged like the thread of a screw. In practice such springs are placed under tension to provide each of them with a helical opening permitting the passage of liquid to be filtered. Such springs provide a suitable base for the support of filter aid, such as diatomaceous earth or the like, whereby efficient filtering may be accomplished.

An object of the present invention is to provide an improved filter embodying elongated helical springs which is efficient in operation and which may be readily cleaned when cleaning is required.

A further object is to provide a filter embodying elongated helical springs having improved means for attaching said springs to the remainder of the filter mechanism.

A further object is to provide an improved filter embodying helical springs having readily operable means for adjusting the helical filter space of said springs.

A further object is to provide an improved filter embodying elongated helical springs having readily operable means for cleaning said springs and for disposing of dirt removed from said springs.

A further object is to provide an improved filter of simple and sturdy construction which may be readily assembled and disassembled.

A further object is to provide a filter well adapted to meet the needs of commercial operation.

Further objects will appear as the description proceeds.

Referring to the drawings—

Figure 1 is a top plan view of a filter embodying the principles of the present invention;

Figure 2 is a view in side elevation, partly in section, of the construction shown in Figure 1;

Figure 3 is a vertical sectional view taken along the plane indicated by the arrows 3—3 of Figure 1;

Figure 4 is a vertical sectional view taken along the plane indicated by the arrows 4—4 of Figure 3;

Figure 5 is a sectional view showing a detail taken along the plane indicated by the arrows 5—5 of Figures 1 and 3;

Figure 6 represents a detail of construction illustrating how the coil springs are attached at one end to the remainder of the filter mechanism; and Figure 7 is a detail of construction illustrating how coil springs are attached at their other ends to the remainder of the filter construction.

The numeral 10 indicates a receptacle of generally rectangular construction, open at the top. Said receptacle 10 is provided with the bottom wall 11, the end walls 12 and 13, and the side walls 14 and 15. Extending from end to end of the receptacle 10, intermediate of the side walls 14 and 15, is the stationary weir 16, the upper extremity of which is located at approximately the level of the upper extremities of the side walls 14 and 15. The lower extremity of the fixed weir 16 is indicated by the numeral 17 and is located a material distance above the bottom wall 11. Said fixed weir 16 divides the receptacle 10 into a pair of compartments indicated by the numerals 18 and 19.

The end wall 12 is provided near the top thereof with the inlet pipe 20 for the admission into the compartment 18 of liquid to be filtered. An overflow pipe 21 may be provided at a higher level than the inlet pipe.

The compartment 19 is provided with the arcuate false bottom 22 extending the length of the filter from the wall 12 to the wall 13. Said arcuate bottom 22, as shown in Figure 4, contacts at one of its sides with the end wall 12 and at its other side is provided with the flat portion 23 bounded by the downwardly extending edge portion 24. Said flat portion 23 is adapted to support the movable weir 25, the upper extremity of which is indicated by the numeral 26. It will be noted that the upper extremity 26 of the weir 25 is located at a higher level than the lower extremity of the fixed weir 16. Said weir 25 is adapted to be moved in a vertical direction and is guided in this movement by a pair of U-shaped guiding members 27—27 secured to the end walls 12 and 13 of the filter. Said movable weir 25 is provided with a pair of hook members 28—28, which may be grasped by the operator of the filter and hooked over the upper edge of the fixed weir 16.

The numeral 29 indicates as a whole a filter spring assembly. Said assembly includes a plurality of elongated helical springs 30—30 carried by the header 31 and the supporting member 32. The header 31 consists of two saucer-shaped members 31a—31b, each of which may have the general contour of the supporting member 32. Said saucer-shaped members 31a—31b are secured together by means of the bolts 33 and provide a chamber 34. Each of the members 31a and 32 provides a continuous wall provided with a plurality of holes, to be referred to more particularly hereinafter. Said walls presented toward said springs are smooth faced. The header 31 and the supporting member 32 are mounted upon the pipe 35, threaded adjacent to its extremities as indicated by the numerals 36 and 37. The header 31 and the supporting member 32 are centrally apertured, the apertures being bounded by the inwardly and outwardly extending flanges 38 adapted to engage the threaded portions 36 and 37 of the pipe 35. Nuts 39 and 40 cooperate with the header 31 to mount it rigidly in a predetermined position upon the pipe 35. Nuts 41 and 42 cooperate with the flange 38 of the supporting member 32 for adjustably positioning said member 32 relative to the header 31. Said pipe 35 is provided with a plurality of apertures 43, permitting communication between the interior of the header 31 and the interior of the pipe 35.

The elongated spring members 30—30 are preferably disposed in parallel relationship with the axis of the pipe 35, and said pipe 35 is mounted to have a movement of rotation in a horizontal position.

The pipe 35 is roatably carried at one of its ends by a bearing indicated as a whole by the numeral 44, which includes the plates 44a and 44b mounted, respectively, on the inside and outside of the end wall 12. The plate 44a embodies a collar having a stepped bearing portion made up of the annular portion 45 and the upwardly opening bearing portion 46. The upper boundary of the upwardly opening bearing portion 46 is indicated in Figure 3 by the dotted line bearing the reference numeral 47. The nut 39 located upon the adjacent extremity of the pipe 35 serves as a trunnion and is adapted to have a loose running fit within the annular bearing portion 45 of the plate 44a. Said nut 39 is stepped in diameter to provide an end bearing engaging against the adjacent face of the annular bearing portion 45. The adjacent portion of the nut 39 is adapted to rest on the upwardly opening bearing portion 46 of the plate 44a.

The right-hand extremity of the pipe 35 as the parts are viewed in Figure 3 is supported by the bracket 48 carried by the end wall 13 in a manner to be referred to presently. Said bracket 48 includes a bottom bearing portion 49 and a top bearing 50 hingedly carried by the bearing portion 49, a hinge for this purpose being indicated by the numeral 51. A catch member 52 is provided for releasably holding the top bearing portion 50 in cooperative relationship with the bottom bearing portion 49. A nut 53 is disposed upon the end of the pipe 35 and is held firmly in position by means of the pin 54. Said nut is provided with the annular shoulder 55 for taking up end thrust against the bearing portions 49 and 50. Said nut 53 has a cylindrical bearing surface and serves as a trunnion cooperating with the bearing portions 49 and 50.

Mounted in the right-hand extremity of the pipe 35 (Fig. 3) is the plug member 58, stopping flow of fluid through the adjacent end of said pipe. Said plug 58 has a portion 59 extending beyond the end of said pipe 35, which portion 59 is provided with a diametrically disposed slot 60 opening toward the right as the parts are viewed in Figure 3, and also opening at its two ends at the periphery of said portion 59. The two parallel side walls of the slot 60 are adapted to receive the tenon 61 of the rotatable member 62. Said rotatable member is rotatably carried by a bearing 63 comprising the plates 63a and 63b adapted to be bolted on the inside and outside, respectively, of the end wall 13 of the filter. Said plates 63a and 63b have aligned apertures for rotatably receiving the rotatable member 62. Secured to the outer extremity of the rotatable member 62 is the crank 64 weighted to assume a pendant position. When the rotatable member 62 is free of the filter spring assembly 29 the weighted handle 64 will gravitate to a position to hold the tenon 61 in an upright position. The plate 63a may constitute the support for the bracket 48, which supports the adjacent end of the spring assembly 29.

According to practice which is at present preferred, the liquid to be filtered is drawn from the exterior of the coil springs 30—30 into the chamber 34 provided by the header 31, thence through the holes 42 into the pipe 35. The strained liquid is drawn off from the left-hand extremity of the pipe 35 as the parts are viewed in Figure 3 through the conduit 65. Said conduit 65 leads to the pump 66, the discharge side of which is connected to the conduit 67, which leads to the elbow 68. From the elbow 68 the filtered liquid is discharged through the conduit 69 to the machine 70 which is to be cooled and/or lubricated. From the machine 70 the liquid fouled with dirt or grit is discharged through the pipe 20 to the filter. Motive power for driving the pump 66 is supplied by the motor 71, which, through a belt 72 or other preferred driving mechanism, communicates power to the shaft 73 of the pump 66. A pressure gauge 74 may be connected with the suction side of the pump 66 for determining the net force tending to move a liquid to be filtered through the elements 30—30.

Connected with the elbow 68 is the relief valve 75, which is adapted to open when the pressure applied thereto exceeds a predetermined value. When such an excess pressure occurs the relief valve 75 will open to discharge fluid from the elbow 68 back into the compartment 18 of the filter.

In order to mount the coil springs 30—30, the cup-shaped member 31a and the supporting member 32 are provided with aligned holes, the holes in the member 31a being indicated by the numerals 76—76 and the holes in the member 32 being indicated by the numeral 77. As shown in Figure 6, the holes 76 in the cup-shaped member 31a are countersunk, as indicated by the numerals 78—78. The convolutions of each coil spring 30 at the left end thereof as the parts are viewed in Figures 3 and 6 are flared outwardly as indicated by the numeral 79, this flaring being done before the spring is finally tempered. Each spring 30 is sleeved within an auxiliary spring 80 of short length, a few convolutions of the spring 80 at the left end thereof being flared outwardly as indicated by the numeral 81, but adapted to lie against the countersunk wall 78 of the corresponding hole 76. The outward flaring of the end convolutions of the short spring 80, as indicated by the numeral 81, will also be done prior to the final tempering of the corresponding spring 80. Each of the springs 80 will act as a protective sleeve for its corresponding spring 30, and the outwardly flared portions 81—81 thereof will effectively serve as abutments to hold the corresponding springs 30 in proper relationship with a corresponding member 31a.

Mounted within each of the holes 77 in the supporting member 32 is a machine screw 82 having a shank of sufficient size to screw within the corresponding end of a coil spring 30, expanding the convolutions of the corresponding coil spring 30 sufficiently to provide a firm grip. A certain amount of adjustment of tension upon each coil spring 30 is possible by rotation of the corresponding screw 82.

The numeral 83 indicates a scraper adapted to scrape grit, sludge or the like transversely of the arcuate bottom 22 of the compartment 19. This scraper is an elongated member secured to the header 31 and the supporting member 32 in parallel relationship with the axis of the pipe 35. Said scraper 83 has portions 84—84 extending beyond the header 31 and the supporting member 32. As will be explained presently, the scraper 83 is so located as to facilitate the mounting and dismounting of the filter spring assembly 29.

The mode of operation of the above described embodiment of the present invention will be clear without detailed explanation. It may be stated briefly that the filter spring assembly 29 may be built up independently of the receptacle 10, the springs 30 being cut approximately to equal lengths, the header 31 and the supporting member 32 being mounted upon the pipe 35, the springs 30 being mounted within said headers 31 and 32, and the headers 31 and 32 being spaced apart a sufficient distance to apply the required tension to the coil springs 30—30 to provide the desired width of helical opening within each of said springs 30—30. Before or after the mounting of the assembly 29 within the machine, any slight inaccuracy in the helical opening in any spring 30 may be corrected by operation of the corresponding machine screw 82. The spacing between the header 31 and the supporting member 32 and correspondingly the width of helical openings in the springs 30—30 may be adjusted by operation of the nuts 41 and 42. The scraper 83 will be secured in position, and the operator, by grasping the scraper 83, will lower the filter spring assembly 29 into the compartment 19. At this time the upper bearing portion 50 will have been released and swung back out of obstructing relationship with the lower bearing portion 49 of the bracket 48. At this time the weight of the crank 64 biases the rotatable member 62 into a position such that the tenon 61 is upright. The operator will slip the left-hand end of the nut 39 within the bearing portion 45 of the plate 40a, and will allow the right-hand end of the filter spring assembly to descend. The scraper 83 is located in the diameter of the assembly 29, which is symmetrical with the slot 60, and accordingly the slot 60 will be in position to receive the tenon 61 of the rotatable member 62. The upper bearing portion 50 will then be swung into operative position and will be latched in that position by means of the latch member 52. The movable weir 25 will be located in its lowermost position, resting upon the flat portion 23 of the false bottom 22.

Liquid to be filtered will enter the compartment 18 of the filter 10 through the pipe 20 and will flow in a tortuous path under the lower edge of the fixed weir 16, over the upper edge of the movable weir 25, into the compartment 19. According to standard filtration practice, the filter media 30—30 will be pre-coated with filter aid, which may take the form of diatomaceous earth or other well known filter aid.

The motor 71 will operate the pump 66, whereby suction will be applied to the conduit 65 and pipe 35. By reason of reduced pressure in the conduit 65 and pipe 35, liquid will be drawn through the helical interstices of the springs 30—30 and through the filter aid pre-coat encompassing said springs 30—30. The filtered liquid will be drawn into the chamber 34 of the header 31 through the pipe 65 to the pump 66, and will be discharged through the pipe 67 and pipe 69 back to the machine or other device 70 where the liquid is being used.

A common field of application of the present invention will be to the filtering of liquids used in the cooling or lubrication, or both, of a machine such for example as a grinding machine. The cooling or lubricating liquid, after having been fouled in the machine 70, will gravitate through the pipe 20 back to the compartment 18 of the filter 10.

If for any reason the operator should stop the supply of liquid from the conduit 69 to the machine 70 without stopping the motor 71, pressure will build up sufficiently to open the relief valve 75, whereby liquid discharged from the pump 66 through the conduit 67 will discharge through the relief valve 75 into the receptacle 10.

By reason of the overflow outlet 22, any problems due to extra rapid entry of fluid through the conduit 20 will be obviated.

When the filter springs 30—30 tend to become clogged with dirt or the like, said springs may be efficiently cleaned by the mere expedient of rotating the handle 64. The motor 71 will be stopped at this time, whereby to discontinue the suction applied to the pipe 35, and the movable weir 25 will be moved upwardly, the hooks 28—28 being disposed upon the upper extremity of the fixed weir 16. Movement of the coil springs 30—30 through the liquid in the compartment 19 will result in the extending of said springs 30—30, due in part to their inertia and in part to the drag applied thereto by the liquid in the compartment 19. Filter cake upon the springs 30—30 will be broken up and dislodged from the springs 30—30, dropping to the false bottom 22. The scraper 83, moving in the direction of the arrow in Figure 4, will scrape the sludge across the arcuate bottom 22, moving most of it past the flat portion 23 thereof into the bottom of compartment 18, whence it may be removed by any preferred means. The movable weir 26 will then be lowered into its position on the false bottom 22, a new pre-coat of filter aid will be applied to the springs 30—30, and filtration will be resumed, the interruption for cleaning being of only very short duration.

An advantage of the present invention is that the filter springs 30—30 are horizontally disposed. This is a decided advantage inasmuch as it is preferred to discharge fouled liquid by gravity from the machine which is being cooled or lubricated. By reason of the horizontal disposition of the springs 30—30, the length thereof is not limited by the height of the machine with which it is associated. A further decided advantage accruing from the horizontally disposed position of the filter springs 30—30 is that such disposition minimizes the clogging effects of the materials filtered out of the liquid.

Though a preferred embodiment of the present invention has been described in detail, many modifications will occur to those skilled in the art. It is intended to cover all such modifications that fall within the scope of the appended claims.

What is claimed is:

1. In a filter, in combination, a header, a pipe carrying said header, said header comprising a chamber having a continuous wall provided with a plurality of perforations distributed from a region adjacent to said pipe to a region adjacent to the periphery of said header, the interior of said pipe communicating with said chamber, supporting means carried by said pipe in spaced relationship with said header, a plurality of helical springs supported at their ends by said header and said supporting means, the interiors of said coil springs communicating through said perforations with said chamber and said pipe, said pipe and said coil springs having their axes horizontally disposed, said pipe being rotatably mounted, and means for rotating said pipe, said header, said supporting means and said springs.

2. In a filter, in combination, a header, a pipe carrying said header, said header comprising a chamber having a continuous wall provided with a plurality of perforations distributed from a region adjacent to said pipe to a region adjacent to the periphery of said header, the interior of said pipe communicating with said chamber, supporting means carried by said pipe in spaced relationship with said header, a plurality of helical springs supported at their ends by said header and said supporting means, the interiors of said coil springs communicating through said perforations with said chamber and said pipe, said pipe and said coil springs having their axes horizontally disposed, said pipe being rotatably mounted, means for rotating said pipe, said header, said supporting means and said springs, and threaded means for adjusting the distance between said header and said supporting means.

3. In a filter, in combination, a header, a pipe carrying said header, said header comprising a chamber having a continuous wall provided with a plurality of perforations distributed from a region adjacent to said pipe to a region adjacent to the periphery of said header, the interior of said pipe communicating with said chamber, supporting means carried by said pipe in spaced relationship with said header, a plurality of helical springs supported at their ends by said header and said supporting means, the interiors of said coil springs communicating through said perforations with said chamber and said pipe, said pipe and said coil springs having their axes horizontally disposed, said pipe being rotatably mounted, means for rotating said pipe, said header, said supporting means and said springs, and threaded means for adjusting the distance between said header and said supporting means.

4. In a filter, in combination, a pipe, a header carried by said pipe, said header comprising a chamber having a continuous wall provided with a plurality of perforations distributed from a region adjacent to said pipe to a region adjacent to the periphery of said header, supporting means carried by said pipe in spaced relationship with said header, said chamber communicating with the interior of said pipe, and a plurality of coil springs carried at their ends by said wall of said header and by said supporting means, the interiors of said springs communicating through said perforations with said chamber, said pipe being rotatably mounted, and means for rotating said pipe, said header, said supporting means and said springs, said supporting means being provided with screw-threaded means threaded into the corresponding ends of said springs.

5. In a filter, in combination, a receptacle, weir means dividing said receptacle into a plurality of compartments, said weir means including a fixed weir member and a movable weir member, said movable weir member in its operative position being adapted, in combination with said fixed weir member, to cause liquid in passing to one of said compartments from the other of said compartments to take a tortuous path, said one compartment being a settling compartment and having an arcuate bottom, a filter assembly mounted in said one compartment, said assembly being rotatably mounted about an axis coaxial with said arcuate bottom, said axis being horizontally disposed, said assembly being provided with scraper means adapted to clean sludge off said arcuate bottom, said movable weir member being adapted to be moved out of adjacency with said arcuate bottom to permit said scraper means to pass sludge from said arcuate bottom.

6. In a filter, in combination, a receptacle, weir means dividing said receptacle into a plurality of compartments, said weir means including a fixed weir member and a movable weir member, said movable weir member in its operative position being adapted, in combination with said fixed weir member, to cause liquid in passing to one of said compartments from the other of said compartments to take a tortuous path, said one compartment being a settling compartment and having an arcuate bottom, a filter assembly mounted in said one compartment, said assembly being rotatably mounted about an axis coaxial with said arcuate bottom, said axis being horizontally disposed, said assembly being provided with scraper means adapted to clean sludge off said arcuate bottom, said movable weir member being adapted to be moved out of adjacency with said arcuate bottom to permit said scraper means to pass sludge from said arcuate bottom, said assembly including a plurality of coil springs comprising filtering members disposed in parallel relationship with said axis.

7. In a filter, in combination, a receptacle, bearings carried by said receptacle, a removable filter assembly adapted to be carried by said bearings, said filter assembly having trunnions located at its ends, one of said trunnions being adapted to be slipped endwise into one of said bearings, the other of said bearings having a readily removable portion adapted to permit the lowering of the other of said trunnions into said other bearing, said bearings being positioned to limit end thrust of said filter assembly.

8. In a filter, in combination, a container, a pair of bearings carried by said container, a filter assembly having a pair of trunnions adapted to cooperate with said bearings, the axis of said filter assembly being horizontally disposed, said container having an arcuate bottom coaxial with respect to said axis, said filter assembly having a scraper member parallel with said axis and adapted to cooperate with said arcuate bottom for cleaning purposes, said scraper member being adapted to be grasped by an operator for supporting said assembly from above, a rotatable member carried by said container, said rotatable member and the adjacent extremity of said filter assembly being provided with cooperating tenon and slot means, and crank means for said rotatable member adapted to bias said rotatable member to a predetermined position, said tenon and slot means being vertically disposed when said rotatable member is in biased position and when said filter assembly is supported from above by said scraper.

9. In a filter, in combination, a container, a pipe in said container, a header carried by said pipe, said header comprising a chamber having a continuous wall provided with a plurality of perforations distributed from a region adjacent to said pipe to a region adjacent to the periphery of said header, said header communicating with the interior of said pipe, supporting means spaced from said header, a plurality of helical springs stretched between said header and said supporting means and communicating with the interior of said header through said perforations, said pipe being rotatably mounted, means for rotating said pipe, said header, said supporting means and said springs, and pump means communicating with the interior of said pipe for drawing liquid from said container through the interstices of said springs and for delivering filtered liquid to a point of use.

10. In a filter, in combination, an assembly of helical filter springs, a header for supporting adjacent ends of said springs, supporting means for carrying the other ends of said springs, said header having apertures for receiving said springs, said springs having their extremities flared at the region of application to said header, and sleeves encompassing said springs adjacent to said flared extremities, said sleeves having flared extremities whereby to form anchoring means for said springs to hold said springs in said header.

11. In a filter, in combination, an assembly of helical filter springs, a header for supporting adjacent ends of said springs, supporting means for carrying the other ends of said springs, said header having apertures for receiving said springs, said springs having their extremities flared at the region of application to said header, and sleeves encompassing said springs adjacent to said flared extremities, said sleeves having flared extremities whereby to form anchoring means for said springs to hold said springs in said header, said sleeves comprising coil spring members.

12. In a filter, in combination, a container, a filter assembly located in said container, said filter assembly including a pipe, a plurality of helical springs and means for supporting said springs in parallel relationship with said pipe and for providing communication between the interior of said springs and the interior of said pipe, plug means for stopping one end of said pipe, means for applying suction to the other end of said pipe, means for rotatably mounting said pipe, said container having an arcuate bottom coaxially disposed with respect to the axis of said pipe, a scraper movable with said pipe and adapted to scrape material across said arcuate bottom, said scraper being adapted to be grasped by an operator for supporting said assembly from above, a rotatable member carried by said container, and a crank attached to said rotatable member and adapted to bias said rotatable member to a predetermined position, said rotatable member and said plug member having cooperating slot and tenon means adapted to be aligned when said assembly is supported from above by said scraper and said rotatable member is in biased position.

13. In a filter, in combination, a container, a filter assembly located in said container, said filter assembly including a pipe, a plurality of helical springs and means for supporting said springs in parallel relationship with said pipe and for providing communication between the interior of said springs and the interior of said pipe, means for applying suction to said pipe to draw liquid from said container through said springs, means for rotatably mounting said pipe, said assembly being provided with grip means adapted to be grasped by an operator for supporting said assembly from above, a rotatable member carried by said container, and means biasing said rotatable member to a predetermined position, said rotatable member and said assembly having cooperating slot and tenon means adapted to be aligned when said assembly is supported from above by said grip means and said rotatable member is in biased position.

14. A filter comprising a container, a filter assembly within said container, said filter assembly including a plurality of parallel helical springs, said springs having their lengths disposed horizontally, a smooth-faced header having perforations for receiving adjacent ends of said springs, the interior of said springs having communication with said header through perforations, means for stopping the opposite ends of said springs, means rigid with said header for holding said opposite ends in spaced relationship with one another, said filter assembly being rotatably mounted, and means for rotating said assembly for causing extension of said helical springs.

15. A filter comprising a container, a filter assembly within said container, said filter assembly including a plurality of parallel helical springs, said springs having their lengths disposed horizontally, a smooth-faced header having perforations for receiving adjacent ends of said springs, said header having communication with the interior of said springs through said perforations, means for stopping the opposite ends of said springs, means rigid with said header for holding said opposite ends in spaced relationship with one another, and means for revolving said assembly about a horizontal axis for extending said springs for cleaning purposes.

16. In a filter, in combination, a helical spring, a header having an aperture for receiving said spring, and a flexible sleeve within said aperture, the extremity of said spring being flared to a diameter greater than the interior diameter of said sleeve, the adjacent extremity of said sleeve being flared to a diameter greater than the diameter of said aperture.

17. In a filter, in combination, a helical spring, a header having an aperture for receiving said spring, and a flexible sleeve within said aperture, the extremity of said spring being flared to a diameter greater than the interior diameter of said sleeve, the adjacent extremity of said sleeve being flared to a diameter greater than the diameter of said aperture, said sleeve comprising a helical spring.

GEORGE E. OLSON.